United States Patent

[11] 3,579,208

[72] Inventor Peter G. Bartlett
Davenport, Iowa
[21] Appl. No. 812,521
[22] Filed Feb. 28, 1969
[45] Patented May 18, 1971
[73] Assignee Gulf & Western Industries
New York, N.Y.

[54] CERAMIC MEMORY AMPLIFIER
9 Claims, 10 Drawing Figs.

[52] U.S. Cl. ........ 340/173.2
[51] Int. Cl. ........ G11c 9/02
[50] Field of Search ........ 340/173.2

[56] References Cited
UNITED STATES PATENTS
2,845,611 7/1958 Williams ........ 340/174
3,229,261 1/1966 Fatuzzo et al. ........ 340/173.2X

*Primary Examiner*—Stanley M. Urynowicz, Jr.
*Attorney*—Meyer, Tilberry and Body

ABSTRACT: There is disclosed herein a ceramic memory system including a ceramic memory matrix comprised of a plurality of ceramic memory devices each having a first and a second surface respectively connected to a plurality of electrically conductive bit lines and a common line. The bit lines of the ceramic memory device are connected in common to an amplifier having parameters such that when one of the ceramic memory devices is interrogated, the output signal developed by the amplifier is not degraded by the impedance of the remaining ceramic memory devices.

INVENTOR.
PETER G. BARTLETT

BY
*Meyer, Tilberry & Body*
ATTORNEYS

INVENTOR
PETER G. BARTLETT
BY
*Meyer, Tilberry & Body*
ATTORNEYS

CERAMIC MEMORY AMPLIFIER

This application pertains to the art of ceramic memory matrix systems and more particularly to improvements in amplifiers to be utilized with a ceramic memory matrix, such as the memory matrix disclosed in U.S. Pat. application Ser. No. 527,223, now U.S. Pat. No. 3,462,746 entitled "Ceramic Memory Device," filed Feb. 14, 1966 and U.S. Pat. No. 3,401,377, entitled "Ceramic Memory Device and Arrays," issued Sept. 10, 1968, both assigned to the same assignee as the present invention, and which application and patent are herein incorporated by reference.

This invention is particularly applicable to amplifiers to be employed with a binary memory matrix to thereby increase the amplitude of the signal developed by a single binary memory device, and will be described with particular reference thereto, although it is to be appreciated that the invention has broader application and may, for example, be employed with various memory storage devices when connected in the form of a matrix.

In recent years, attention has been directed toward utilizing ceramic materials in the computer field. In particular, attention has been directed toward utilizing the electrostrictive piezoelectric and ferroelectric characteristics found in many of these materials. Ferroelectric storage devices, or capacitors, comprise dielectric materials which depend upon internal polarization rather than upon surface charge for storage of information. A number of such materials are known, such as barium titanate, Rochelle salt, lead metaniobiate and lead titanate zirconate composition. These materials may be prepared in the form of single crystals or ceramics, upon which conductive coatings may be applied to provide terminals. Ferroelectric capacitors exhibit two stable states of polarization, somewhat similar to the stable remanence states of magnetic materials, when subjected to electric fields of opposite polarities, and, as a consequence, are readily adapted for use as binary storage elements. As storage elements, these materials exhibit characteristics that render them usable over a greater temperature range than that of ferromagnetic cores and, for example, have been found to be usable over a range greater than −55° C. to 125° C. The further characteristic of ferroelectric capacitors is the piezoelectric property, or characteristic, of changing dimensions in response to potentials applied across the terminals of the capacitor and, conversely, of producing a voltage differential between the terminals in response to mechanical pressures exerted between the opposing faces of the capacitor.

U.S. Pat. application, Ser. No. 527,223, discussed hereinbefore, discloses a memory device incorporating ferroelectric capacitors. The memory device disclosed therein includes a pair of substantially flat, ferroelectric capacitor plates, one serving as a drive plate and the other as a memory plate. A layer of conductive material is interposed between the two plates. The plates are secured together in such a manner, as by an electrically conductive bond or by heat fusing, so that the drive plate may transmit mechanical forces to the memory plate in directions acting both laterally and perpendicularly of the plane defined by the memory plate, so as to thereby mechanically stress the memory plate. The drive plate is permanently prepolarized and the memory plate is polarized either negatively or positively by application of an electric potential between its opposing flat surfaces, so that it stores binary information, i.e., polarized negatively or positively. When an interrogating readout voltage is applied between opposing surfaces or the drive plate, its dimensions change in directions extending laterally and perpendicularly of its plane, which forces act to also mechanically stress the memory plate which develops an output signal dependent on its state of polarization. This output signal has a duration substantially that of the applied interrogating readout voltage. If the readout voltage is of a polarity opposite to the direction of polarization of the drive plate, then the magnitude of the interrogating readout voltage is kept well below the polarization threshold voltage, i.e., the voltage required to permanently polarize the drive plate, so that the readout process is non-destructive and can be interrogated indefinitely without need for an automatic rewrite cycle, as is normally required in destructive readout memory devices.

In addition to the single bit memory devices, described above, application, Ser. No. 527,223 also discloses a memory matrix having several word lines, each having associated therewith more than one bit. This memory matrix includes one driver plate for each word line having a plurality of ferroelectric memory plates secured thereto to define a plurality of bits. Similarly, application Ser. No. 640,717 now U.S. Pat. No. 3,401,377 discloses a memory matrix having several word lines, each having associated therewith more than one bit. In this matrix, however, a single drive plate and a single memory plate are secured together as a monolithic construction, in which several memory bits, are defined. Each bit, for example, is defined in a portion of the memory plate taken between two conductive strips on opposite surfaces of the memory plate.

In order to provide a single set of output terminals to which the binary information of several memory bits may be applied, it is necessary that the pair of terminals connected to the surfaces of each ferroelectric storage capacitor be connected in parallel, i.e., the terminals of each ferroelectric storage capacitor are cascaded. As the number of ferroelectric storage capacitors is increased, the value of the output voltage developed at the set of terminals upon interrogation of a single bit, decreases in dependence upon the number of cascaded bits. Accordingly, the more bits that are employed in this fashion, the greater will be the degradation of the output voltage upon interrogation of a single bit.

The present invention is directed toward an improved ceramic memory system in which the output voltage developed upon interrogation of a single bit remains substantially constant regardless of the number of bits employed.

In accordance with one aspect of the present invention, there is provided in a ferroelectric capacitor matrix including a plurality of ferroelectric capacitor memory means having first and second oppositely facing surfaces comprising: a plurality of electrically conductive bit lines each respectively connected to the first surface of one of the plurality of memory means; an electrically conductive common line connected to the second surface of each memory means; the first surface of each memory means exhibiting the characteristic of providing a reactive impedance with respect to the second surface; the bit lines being connected in common to provide a matrix output terminal; amplifier means having an input circuit connected to the matrix output terminal and an output circuit means for providing an output signal; and, impedance means exhibiting the characteristic of providing a reactive impedance substantially equal in value to the reactive impedance between the bit line and the common line of each memory means so that the output signal remains substantially constant and is independent of the number of memory means connected between the bit line and the common line.

In accordance with another aspect of the present invention, each memory means also includes driving means having a surface, the second memory means surface and the driving means surface being aligned to face each other, at least a portion of the second surface being secured to the surface of the driving means for transmitting mechanical forces to the memory means to thereby stress the memory means.

The primary object of the present invention is to provide apparatus for developing an output signal upon interrogation of a single ferroelectric storage capacitor in which the value of the output signal is independent of the number of ferroelectric storage capacitors in a ceramic memory matrix.

Another object of the present invention is to provide an amplifier for a ceramic memory matrix in which the output signal remains substantially constant regardless of the number of cascaded ferroelectric storage capacitors or bits.

A still further object of the present invention is to provide a ceramic memory system in which the output signal developed upon interrogation of a single bit is not degraded as the number of cascaded bits is increased.

A still further object of the present invention is to provide circuitry which is relatively simple in manufacture and economical in use to be employed with a ceramic memory matrix for amplifying the signal developed upon interrogation of a single bit.

The foregoing and other objects and advantages of the invention will become apparent from the following description of the preferred embodiments of the invention as read in connection with the accompanying drawings in which.

Figures 2, 3, 4:
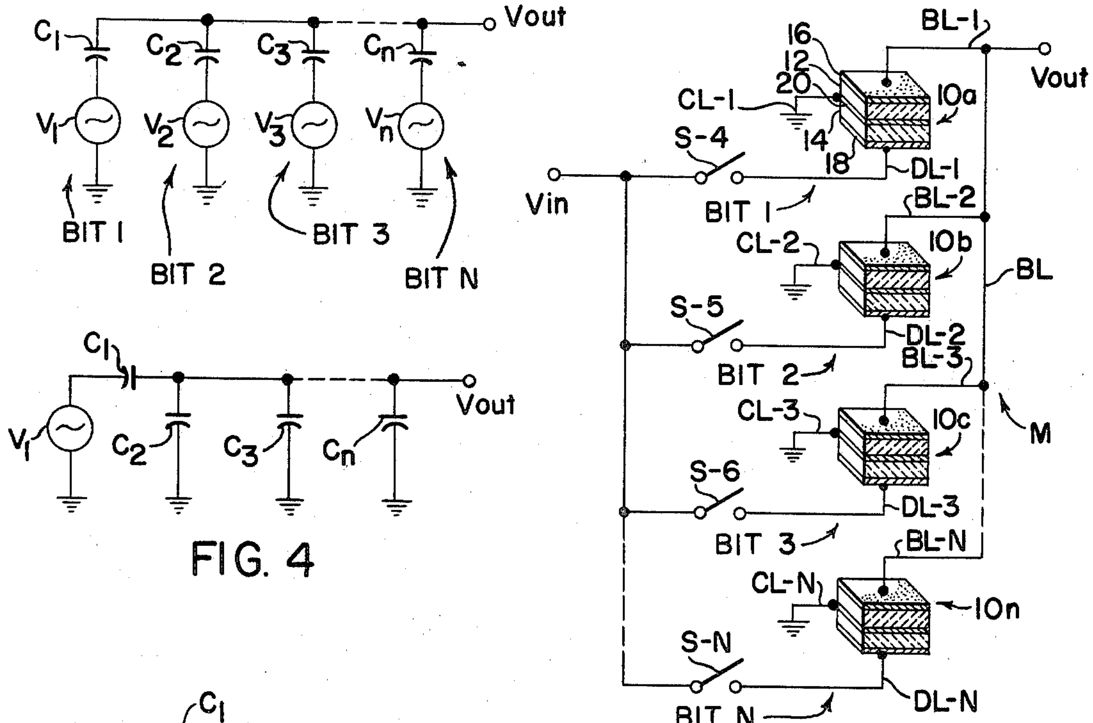
FIG. 2 is a schematic illustration of a ferroelectric capacitor matrix together with circuitry for interrogating the matrix.
FIG. 3 is the schematic illustration of an equivalent electrical circuit representative of the circuit illustrated in FIG. 2.
Figure 5:
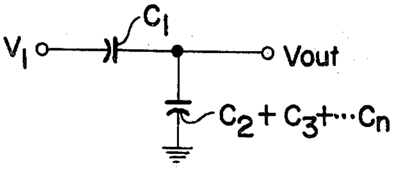
Figures 6, 7, 8, 9, 10:
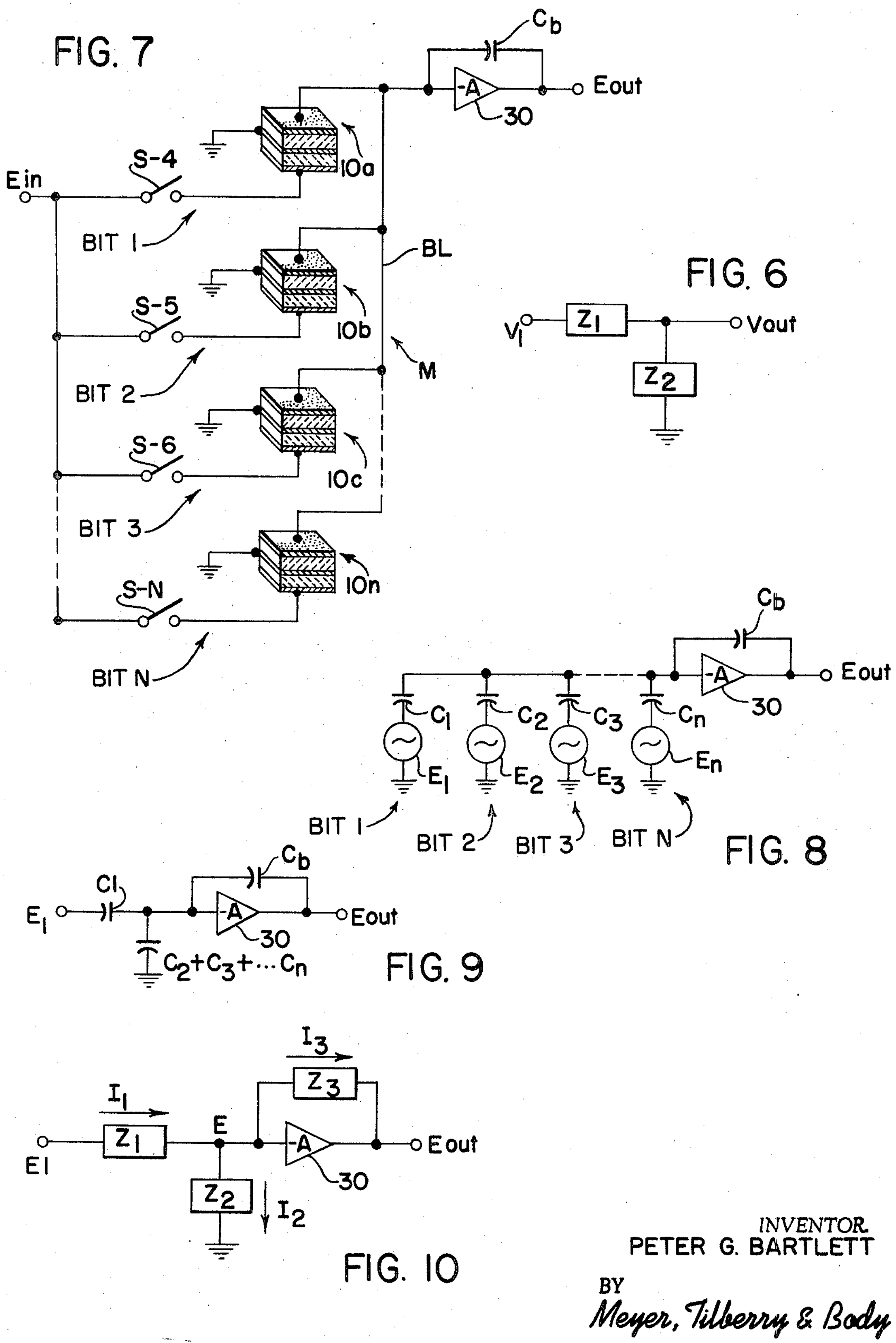

FIGS. 4, 5, and 6 are schematic illustrations of equivalent circuits representative of the circuit illustrated in FIG. 3 upon interrogation of a single bit;

FIG. 7 is a schematic illustration of a ferroelectric capacitor matrix, similar to that shown in FIG. 2; and including an amplifier constructed in accordance with the present invention;

FIG. 8 is a schematic illustration of an equivalent circuit representative of the circuit illustrated in FIG. 7;

FIGS. 9 and 10 are schematic illustrations of the circuit illustrated in FIG. 8 in which a single bit has been interrogated.

Figure 1:
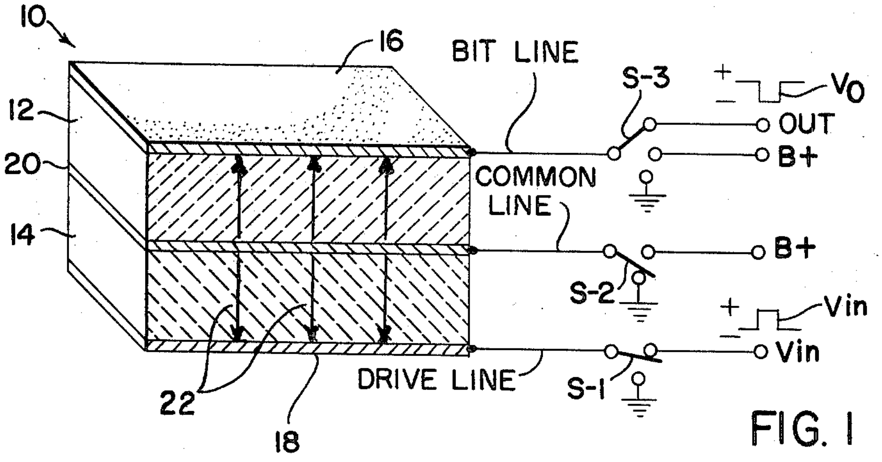
FIG. 1 is a schematic illustration of a ceramic memory single bit construction, illustrating the principles upon which the present invention is based.

Before describing the preferred embodiments of the invention, attention is directed toward the following description of a single bit memory device constructed in accordance with the teachings of U.S. Pat. application, Ser. No. 527,23. As shown in FIG. 1, that structure includes a single bit ceramic memory device 10, which generally comprises a memory plate 12 constructed of ferroelectric material, such as barium titanate, Rochell salt, lead metaniobiate or lead titanate zirconate composition, for example. In its preferred form, however, memory plate 12 is constructed of lead titanate zirconate composition since it is easy to polarize. Drive plate 14 is preferably constructed of ferroelectric material having piezoelectric characteristics, such as lead titanate zirconate composition. However, the drive plate may be constructed of any material that will change its dimensions upon application of an electrical signal, such as, for example, magnetostrictive material which upon application of current thereto will undergo physical dimension changes. Drive plate 14 is permanently polarized and need not be constructed of easily polarizable material, such as lead titanate zirconate composition.

Plates 12 and 14 are, in their unstressed condition, approximately flat, and are oriented so as to be in substantial superimposed parallel relationship. The upper surface of plate 12 is coated with an electrically conductive layer 16, and the lower surface of plate 14 is coated with an electrically conductive layer 18. Layers 16 and 18 may be of any suitable electrically conductive material, such as silver. Interposed between facing surfaces of plates 12 and 14 there is provided a third layer 20 of electrically conductive material. Layer 20 may be constructed of a conductive epoxy, such as epoxy silver solder, so that facing surfaces of plates 12 and 14 are electrically connected together as well as mechanically secured together. In this manner, as will be described below, when drive plate 14 is stressed it, in turn, transmits mechanical forces to plate 12, so as to mechanically stress plate 12 in directions acting both laterally and perpendicularly of its plane.

Drive plate 14 may be permanently polarized by applying an electric field across its opposing flat surfaces. Thus, as shown in FIG. 1, layer 18 is electrically connected to a single pole, double throw switch S1 which serves to connect layer 18 with either an electrical reference, such as ground, or to an interrogating readout voltage source $V_{in}$. Similarly, layer 20 is connected with the single pole, double throw switch S2. Switch S2 serves to connect layer 20 with either an electrical reference, such as ground, or to a source of polarizing voltage B+. Plate 14 may now be polarized by connecting layer 20 with the B+ voltage supply source and layer 18 to ground potential. Thus, an electrical field of sufficient magnitude to polarize plate 14 is applied across the opposing faces of the plate. The direction of the electric field is indicated by arrows 22. Thereafter, switches S1 and S2 may be returned to positions as shown in FIG. 1 for a subsequent readout operation.

Binary information may be stored in memory plate 12 by applying an electric field between the opposing faces of the plate in either one of two directions, so that the plate stores either a binary 1 or a binary 0 signal. Layer 16 is connected to a single pole switch S3. Switch S3 serves to connect layer 16 with either a ground potential, or a B+source of polarizing potential, or to an output circuit OUT. When it is desired to store a binary 1 single in memory plate 12, switches S2 and S3 are manipulated so that B+ potential is applied to layer 16 and ground potential is applied to layer 20. As shown in FIG. 1, however, memory plate 12 stores a binary 0 signal, which results from having applied B potential to layer 20 and ground potential to layer 16.

With switches S1, S2, and S3 in the positions as shown in FIG. 1, an interrogating input voltage $V_{in}$ is applied to layer 18. If the applied voltage $V_{in}$ is of a polarity opposite to the direction of polarization of the drive plate, then the magnitude of this interrogation voltage is kept well below the polarization voltage threshold, i.e., the voltage required to permanently polarize drive plate 14, so that the readout process is nondestructive. Application of the readout voltage pulse causes the drive plate to contract or expand in the direction dependent on its prepolarization, as well as the polarity of the applied readout voltage pulse. The direction of contraction or expansion will be both laterally and perpendicularly of the plane defined by plate 14. Since plates 12 and 14 are bonded together, as by the layer 20 of conductive epoxy, any change in physical dimensions of plate 14 will cause corresponding changes in physical dimensions of plate 12. When the memory plate is thus stressed, it develops a voltage which appears between layers 16 and 20, with the polarity at layer 20 being positive or negative, dependent on the state of prepolarization of the memory plate, as well as the direction of mechanical stress. Thus, with reference to FIG. 1, the output voltage $V_0$ will be a negative pulse representative that a binary 0 signal is stored by plate 12. For a further description of a ceramic memory device as shown in FIG. 1, reference should be made to U.S. Pat. application, Ser. No. 527,223.

CERAMIC MEMORY MATRIX

Having now described a single bit ceramic memory device, together with the manner in which binary information is stored and interrogated, references now made to the ceramic memory matrix M of FIG. 2. For purposes of simplification, this matrix is shown as including only three ceramic memory devices and an $N^{the}$ ceramic memory device each preferably being of the type illustrated in FIG. 1; however, it should be appreciated that any desired number of memory devices could be employed. The memory devices are arranged in a vertical column and include devices 10*a*, 10*b*, 10*c*, and 10*n*. The lower surfaces 18 of driver plates 14 of each memory device are respectively connected through drive lines DL–1, DL–2, DL–3, and DL–N, and switches S–4, S–5, S–6, and S–N to an interrogating voltage supply source $V_{in}$. The electrically conductive epoxy layer 20 between plates 12 and 14 of each memory device 10*a*, 10*b*, 10*c*, and 10*n* are respectively connected through common lines CL—1, CL–2, CL–3, and CL–N to ground. Further, the upper surfaces 16 of memory plates 12 are respectively connected through bit lines BL–1, BL–2, BL–3, and BL–N to a common bit line BL which provides the output voltage signal $V_{out}$. Thus, ceramic memory matrix M is comprised of bit line 1, bit line 2, bit line 3, and bit line N which are connected in parallel or cascaded.

Reference is now made to FIG. 3 which illustrates an equivalent circuit for the ceramic memory matrix of FIG. 2 and is comprised of capacitors $C_1$, $C_2$, $C_3$, and $C_n$which respectively represent the equivalent capacitance exhibited by the single bit ceramic memory devices 10$a$, 10$b$, 10$c$ and 10$n$ illustrated in FIG. 1. The voltages $V_1$, $V_2$, $V_3$, and $V_n$ represent the equivalent series voltage generator of the individual memory cells 10$a$, 10$b$, 10$c$, 10$n$, respectively. Thus, capacitors $C_1$, $C_2$, $C_3$, and $C_n$ are respectively connected in series with voltage sources $V_1$, $V_2$, $V_3$, and $V_n$ between the common $V_{out}$ terminal and ground.

Upon interrogation of bit line 1 by the closure of switch S—4, the equivalent circuit for the matrix illustrated in FIG. 2 is shown in FIG. 4. As is readily apparent, this circuit is similar to the circuit shown in FIG. 3 with the exception of voltage sources $V_2$, $V_3$, and $V_n$ appearing as short circuits, i.e., capacitors $C_2$, $C_3$, and $C_n$ are connected directly to ground. As is readily apparent, capacitors $C_2$, $C_3$, and $C_n$ of FIG. 4 are combined to provide the somewhat simpler circuit illustrated in FIG. 5. By substituting impedances equivalent to the capacitances of FIG. 5, the resultant circuit is that shown in FIG. 6, and, with respect to FIG. 6;

$$V_{out}=\frac{Z_2V_1}{Z_1+Z_2} \qquad (1)$$

where $Z_1$ equals the series impedance and $Z_2$ equals shunt impedance.

Since $Z_1$ represents the impedance of $C_1$ which equals $1/j\omega C_{1aq}$ and $Z_2$ represents the impedance of $C_2+C_3\ldots C_n$ which equals $1/j\omega(C_2+C_3+\ldots C_n)$, therefore:

$$V_{out}=\frac{1/j\omega(C_2+C_3+\cdots C_n)}{1/j\omega C_1+1/j\omega(C_1+C_2+\cdots C_n)} \qquad (2)$$

and $$V_{out}=\frac{C_1V_1}{C_1+C_2+C_3+\cdots C_n} \qquad (3)$$

From the equation (3) it is readily apparent that as capacitances are added to the circuit, assuming the input voltage $V_1$ remains constant, the output voltage is degraded or decreases in value. Thus, with each addition of a ceramic memory device to the matrix of FIG. 2, the output voltage $V_{out}$ decreases accordingly. In a similar manner, if a conventional amplifier is coupled to the output terminal $V_{out}$, the signal developed by the amplifier decreases in value with the addition of each ferroelectric storage capacitor memory device.

COMPENSATED CIRCUIT

FIG. 7 illustrates the preferred embodiment of the present invention and is similar to the circuit of FIG. 2, accordingly, similar numbers are employed to designate similar elements. The preferred embodiment also includes an amplifier 30 having a feedback circuit comprised of a capacitor $C_b$ connected between common bit line BL and an output terminal $E_{out}$. The interrogating voltage supply source is designated $E_{in}$. Amplifier 30 generally takes the form of an operational amplifier; however, as will become apparent from the following description, the amplifier preferably exhibits a gain characteristic equal to approximately infinity.

FIG. 8, is analogous to FIG. 3 and generally illustrates the electrical equivalent circuit for the ceramic memory matrix illustrated in FIG. 7. Thus, the circuits illustrated in FIGS. 8 through 10 are similar to the circuits shown in FIGS. 3, 5 and 6 with the exception of the equivalent voltage sources being designated as $E_1$, $E_2$, $E_3$, and $E_n$, and the addition of amplifier 30 and impedance $C_b$ or $Z_3$.

The equations for branch currents $I_1$, $I_2$, and $I_3$ of FIG. 10 are as follows:

$$I_1=\frac{E_1-E}{Z_1} \qquad (4)$$

$$I_2=E/Z_2 \qquad (5)$$

and $$I=\frac{E-E_{out}}{Z_3} \qquad (6)$$

Since $I_1=I_2+I_3$ $$\frac{E_1-E}{Z_1}=\frac{E-E_{out}}{Z_3}+\frac{E}{Z_2} \qquad (7)$$

and $$E(Z_1Z_2+Z_1Z_3+Z_2Z_3)=E_1Z_2Z_3+E_{out}Z_1Z_2 \qquad (8)$$

also $$-AE=E_{out} \qquad (9)$$

therefore:

$$E=\frac{E_{out}}{-A} \qquad (10)$$

Substituting Equation (8) into Equation (10), we have;

$$-\frac{E_{out}}{A}(Z_1Z_2+Z_1Z_3+Z_2Z_3)=E_1Z_2Z_3+E_{out}Z_1Z_2 \qquad (11)$$

and $$\frac{E_{out}}{E_1}=-\frac{AZ_2Z_3}{Z_1Z_2+Z_1Z_3+Z_2Z_3+A_1Z_2} \qquad (12)$$

if $Z_3$ is made equal to $Z_1$ then;

$$\frac{E_{out}}{E_1}=-\frac{AZ_1Z_2}{Z_1Z_2+Z_1Z_1+Z_2Z_1+AZ_1Z_2} \qquad (13)$$

and if A is made very large, then;

$$AZ_1Z_2\gg Z_1Z_2+Z_1Z_1+Z_1Z_2 \qquad (14)$$

thus:

$$\frac{E_{out}}{E_1}\approx\frac{AZ_1Z_2}{AZ_1Z_2}=-1 \qquad (15)$$

or $$E_{out}=\text{inverse of } E_1 \qquad (16)$$

if A is made equal to infinity, then;

$$\frac{E_{out}}{E_1}=-\frac{AZ_1Z_2}{AZ_1Z_2}=-1 \qquad (17)$$

Thus, from the above equations, it is readily apparent that if the amplification factor or gain characteristic $-A$ of amplifier 30 is made very large (Equation 14), preferably approaching infinity, and if the capacitive reactance $Z_3$ of capacitor $C_b$ is made substantially equal to the value of the capacitive reactance $Z_1$ exhibited by a single ferroelectric storage capacitor memory device (Equation 13), the value of the output signal $E_{out}$ is independent of the capacitive reactances $Z_1$ and $Z_2$ and remains approximately constant regardless of the number of ferroelectric storage capacitors which are added or cascaded to memory matrix M. In the preferred embodiment, the capacitive reactance exhibited by each memory bit 10$a$, 10$b$, 10$c$, or 10$n$ is substantially equal to that of the other memory bits; therefor, the capacitive reactance of $C_b$ could be made equal in value to that exhibited by any one of the memory bits 10$a$, 10$b$, 10$c$, or 10$n$ to provide the required compensation. The amplification factor of amplifier 30 preferably lies within a range of 60,000 to 150,000; however, as may be seen from Equation (14), as the value of the amplification factor approaches infinity, Equation (15) becomes more exact.

As illustrated in FIG. 7, upon closure of switches S–4, S–5, S–6, or S–N, a binary 0 or binary 1 readout signal, depending upon the direction of polarization of the respective drive plate, is applied to bit line BL. This readout signal is amplified through amplifier 30, preferably having an amplification factor approaching infinity, and provides an output signal $E_{out}$. A portion of the output signal $E_{out}$ is fed back to the input terminal of amplifier 30 through a capacitor $C_b$ having a value equal to the capacitive reactance of a single memory bit 10$a$, 10$b$, 10$c$, or 10$n$, thereby compensating for the capacitive reactance of shunt capacitances $C_2$, $C_3$, and $C_n$. With this compensation, an unlimited number of memory bits may be connected in parallel or cascaded without degrading the output signal $E_{out}$.

Although the invention has been shown in connection with a preferred embodiment, it will be readily apparent to those skilled in the art that various changes in form and arrangement of parts may be made to suit requirements without departing from the spirit and scope of the invention as defined by the appended claims.

I claim:

1. In a ferroelectric capacitor matrix including a plurality of ferroelectric capacitor memory means having first and second oppositely facing surfaces; each said first surface exhibiting the characteristic of providing a reactive impedance with respect to a corresponding second surface, the improvement for developing a substantially constant output signal regardless of the number of ferroelectric capacitor memory means and comprising:

a plurality of electrically conductive bit lines each associated with one of said memory means and adapted to be electrically connected to the first surface of said associated one of said memory means; a common bit line connected to at least two said bit lines to provide a matrix output terminal;

electrically conductive means for electrically connecting the second surface of each said memory means with a reference voltage;

amplifier means having an input circuit connected to said matrix output terminal and output circuit means for carrying an output signal; and, impedance means exhibiting the characteristic of providing a reactive impedance substantially equal in value to said reactive impedance of a said first surface with respect to a said second surface; said impedance means being connected between said output circuit means and said input circuit of said amplifier so that the value of the output signal is substantially independent of the number of ferroelectric capacitor memory means connected between said common bit line and said reference voltage.

2. In a ferroelectric capacitor matrix as set forth in claim 1 wherein said capacitor matrix includes a plurality of rows each including at least one said ferroelectric capacitor memory means;

each said memory means exhibiting the characteristic of storing binary 1 and binary 0 signals, as desired; and, said impedance means includes a capacitance means exhibiting a reactive impedance substantially equal in value to said reactive impedance of a said first surface with respect to a said second surface.

3. In a ferroelectric capacitor matrix as set forth in claim 2 wherein said amplifier means exhibits the characteristic of providing an amplification factor having a value in excess of 500.

4. In a ferroelectric capacitor matrix as set forth in claim 2 wherein said amplifier means exhibits the characteristic of providing an amplification factor having a value approaching infinity.

5. In a ferroelectric capacitor matrix as set forth in claim 2 wherein said impedance means is a feedback path connected between said output circuit means and said input circuit and includes a capacitance means having a reactive impedance equal in value to the value of said reactive impedance of a said first surface with respect to a said second surface.

6. A ceramic memory system comprising:

a plurality of ceramic memory means each including:

a ferroelectric storage capacitor memory plate having a first and a second surface, said plate adapted to be polarized in one of two stable states; said first surface exhibiting the characteristic of providing a capacitive reactance with respect to a corresponding second surface; and, driving means having a surface, said second memory plate surface and said driving means surface being aligned to face each other, at least a portion of said second surface being secured to at least a portion of the surface of said driving means for transmitting mechanical forces to said memory plate to thereby stress said memory plate;

a plurality of electrically conductive bit lines each associated with one of said memory means and adapted to be electrically connected to the first surface of said associated one of said memory means; a common bit line connected to at least two said bit lines to provide a matrix output terminal;

amplifier means having an input circuit connected to said matrix output terminal and an output circuit means for carrying an output signal; and, impedance means exhibiting a capacitive reactance equal to substantially the value of said capacitive reactance of a said first surface with respect to a said second surface; said impedance means being connected between said output circuit means and said input circuit of said amplifier so that the value of the output signal is substantially independent of the number of ferroelectric capacitor memory means connected between said common bit line and said reference voltage.

7. A ceramic memory system as set forth in claim 6 wherein said plurality of ceramic memory means is a ferroelectric capacitor matrix and includes a plurality of rows each including at least one ferroelectric storage capacitor memory means;

each said memory means exhibiting the characteristic of storing binary 1 and binary 0 signals, as desired; and, said impedance means includes a capacitance means exhibiting a capacitive reactance substantially equal in value to said capacitive reactance of a said first surface with respect to a said second surface.

8. In a ceramic memory system as defined in claim 7 wherein said amplifier means exhibits the characteristic of providing an amplification factor having a value in excess of 500.

9. In a ceramic memory system as defined in claim 7 wherein said amplifier means exhibits the characteristic of providing an amplification factor having a value approaching infinity.